United States Patent

Fulks

[11] Patent Number: 5,255,191
[45] Date of Patent: Oct. 19, 1993

[54] VEHICLE SUSPENSION CONTROL WITH RELATIVE SUSPENSION POSITION SENSOR AND DIFFERENTIATOR

[75] Inventor: Gary C. Fulks, Paris, France

[73] Assignee: General Motors Corporation, Detroit, Mich.

[21] Appl. No.: 858,122

[22] Filed: Mar. 26, 1992

[51] Int. Cl.⁵ .............................................. B60G 17/04
[52] U.S. Cl. .............................. 364/424.05; 280/707; 280/840
[58] Field of Search .................... 364/424.05; 280/707, 280/840

[56] References Cited

U.S. PATENT DOCUMENTS

| | | | |
|---|---|---|---|
| 4,579,366 | 4/1986 | Doi et al. | 280/707 |
| 4,765,648 | 8/1988 | Mander et al. | 280/707 |
| 4,934,731 | 6/1990 | Hiwatashi et al. | 280/707 |
| 5,024,460 | 6/1991 | Hanson et al. | 280/707 |
| 5,029,328 | 7/1991 | Kamimura et al. | 280/707 |
| 5,033,770 | 7/1991 | Kamimura et al. | 364/424.05 |
| 5,071,157 | 12/1991 | Majeed | 280/707 |
| 5,071,159 | 12/1991 | Kamimura et al. | 280/707 |

OTHER PUBLICATIONS

*Operational Amplifier Characteristics and Applications,* Robert G. Irvine, Prentice Hall, Inc., Englewood Cliffs, N.J. 1981, pp. 156–162.

*Primary Examiner*—Gary Chin
*Attorney, Agent, or Firm*—Robert M. Sigler

[57] ABSTRACT

A vehicle suspension control includes a differentiator for deriving an analog relative suspension velocity signal from a relative suspension position sensor; and the analog relative suspension velocity signal is A/D converted by digital signal processing apparatus at a predetermined sampling frequency. The differentiator comprises a bandpass filter having a linearly increasing gain and a 90 degree phase lead for differentiator action in a low frequency range of vehicle suspension resonances (0.5–20 Hz) in which signal differentiation is desired, a peak in gain and group delay at an intermediate frequency above the low frequency range of vehicle suspension resonances, at which vehicle suspension inputs are small, and a decreasing gain from the intermediate frequency to a higher aliasing frequency (500 Hz) related to the sampling frequency of the digital signal processing apparatus. The circuit is used in combination with a two pole low pass filter to further decrease gain above the intermediate frequency; and, even with the low pass filter, it has low group delay in the low frequency range.

10 Claims, 3 Drawing Sheets ated Apr. 1, 1986, which circuit comprises an
VEHICLE SUSPENSION CONTROL WITH RELATIVE SUSPENSION POSITION SENSOR AND DIFFERENTIATOR

BACKGROUND OF THE INVENTION

This invention relates to a motor vehicle suspension control having a differentiator circuit for converting a vertical suspension position signal from a relative suspension position sensor between the sprung and unsprung masses to a relative suspension velocity signal useful in deriving a control signal for a suspension actuator to produce a desired suspension behavior.

Such a differentiator has several requirements which must be met. The first is that it operate as a differentiator within a certain frequency range of interest. Passenger motor vehicles typically have suspension resonances in the region of 1 Hz for the vehicle body or sprung mass and about 8-10 Hz for the wheel apparatus or unsprung mass. In addition, the frequency of greatest sensitivity of a seated occupant to vertical vibration is about 5-6 Hz. Therefore, the circuit must have the characteristics of a differentiator—that is, linearly increasing gain and a constant 90 degree phase lead—throughout a frequency range including these frequencies: for example, 0.5 to 20 Hz.

A typical textbook differentiator circuit of the type capable of producing such a response is shown as differentiator 12 of FIG. 5 in U.S. Pat. No. 4,579,366 to Doi et al, issued Apr. 1, 1986, which circuit comprises an operational amplifier OP3 with a series input capacitor C and a negative feedback resistor R6. However, the linearly increasing gain of this circuit continues past the upper limit of the frequency range of interest until a high frequency roll-off begins at a significantly higher frequency due to the inherent capacitances of the circuit. The result is an extended high gain above the frequency range of interest which tends to amplify high frequency noise.

A preferred form of suspension control for motor vehicles not shown by Doi et al comprises a digital microcomputer or other programmed digital signal processing apparatus. An analog relative suspension velocity signal must be A/D converted to a digital signal for use in such apparatus; and the digital signal processing apparatus thus samples the analog signal at a predetermined sampling frequency: for example, 1 KHz. In order to prevent aliasing distortion, the sampling frequency must be at least twice the highest frequency in the analog input signal. Thus, any component of the analog relative suspension velocity signal above the aliasing frequency of 500 Hz, which is one half the sampling frequency, must be suppressed. This means that the gain of the differentiator circuit, in combination with any additional filters, must decrease to a predetermined low value at the aliasing frequency of 500 Hz. Typically, the natural high frequency roll-off of the inherent circuit capacitance is insufficient to accomplish this task; and further circuit elements must be added to produce additional low pass filter poles and thus accelerate the roll-off with frequency.

Unfortunately, such low pass filter poles also cause accelerated phase change with frequency, which introduces group delay; and this group delay can degrade the performance of a real time suspension control system. Increasing the number of low pass filter poles increases the roll-off in gain; but it also increases the group delay. In fact, the main problem becomes a tradeoff between high frequency gain roll-off and group delay so that it is difficult to simultaneously provide (1) the required differentiator characteristic in the range of vehicle suspension resonant frequencies, (2) sufficient roll-off in gain at the aliasing frequency of A/D conversion, and (3) sufficiently low group delay in a differentiator circuit.

SUMMARY OF THE INVENTION

A solution to the problem has been found in a differentiator circuit comprising a bandpass filter having a linearly increasing gain and a 90 degree phase lead in a low frequency range of vehicle suspension resonances in which signal differentiation is desired, a peak in gain and group delay at an intermediate frequency above the low frequency range of vehicle suspension resonances in which vehicle suspension inputs are small, and a decreasing gain from the intermediate frequency to a higher aliasing frequency related to the sampling frequency of the digital signal processing apparatus.

In more detail, the differentiator comprises an operational amplifier with a first resistor connected in negative feedback around the operational amplifier. A differentiator input is provided through a first capacitor connected to an inverting input of the operational amplifier. The first capacitor and first resistor provide a linearly increasing gain and 90 degree phase lead for differentiating action over the low frequency range of vehicle suspension resonances.

The differentiator further comprises a second resistor connecting the differentiator input in series with the first capacitor and a second capacitor connected from an output of the operational amplifier to the junction of the second resistor and first capacitor. The second resistor and second capacitor, together with the first resistor and first capacitor, define a high Q bandpass filter with a peak at an intermediate frequency above the low frequency range of vehicle suspension resonances. The second resistor and second capacitor together provide a falling gain from the intermediate frequency to define a predetermined low gain at a higher aliasing frequency related to the sampling frequency of the digital signal processing apparatus.

The differentiator further comprises a third capacitor connected in parallel with the first resistor to control the Q of the circuit so as to balance the amplitude of the peak in gain at the resonant frequency with the group delay in the lower frequency range of vehicle suspension resonances. Although group delay may be substantial above the low frequency range of suspension resonances, due to the fast changing phase near the intermediate frequency, the suspension inputs in this frequency range are minimal. Minimal group delay is maintained in the low frequency range of suspension resonances by the substantially constant 90 degree phase lead through this frequency range. The group delay of the differentiator in the low frequency range is sufficiently low that a two pole low pass filter may, and preferably does, precede the differentiator for additional rejection at frequencies above the intermediate frequency. The resulting combination of low pass filter and differentiator circuits has high frequency noise rejection and low frequency group delay providing satisfactory service in a digital vehicle suspension control system at comparatively low cost.

Further details and advantages of this invention will be apparent from the accompanying drawings and following description of a preferred embodiment.

DESCRIPTION OF THE PREFERRED EMBODIMENT

Figure 1:
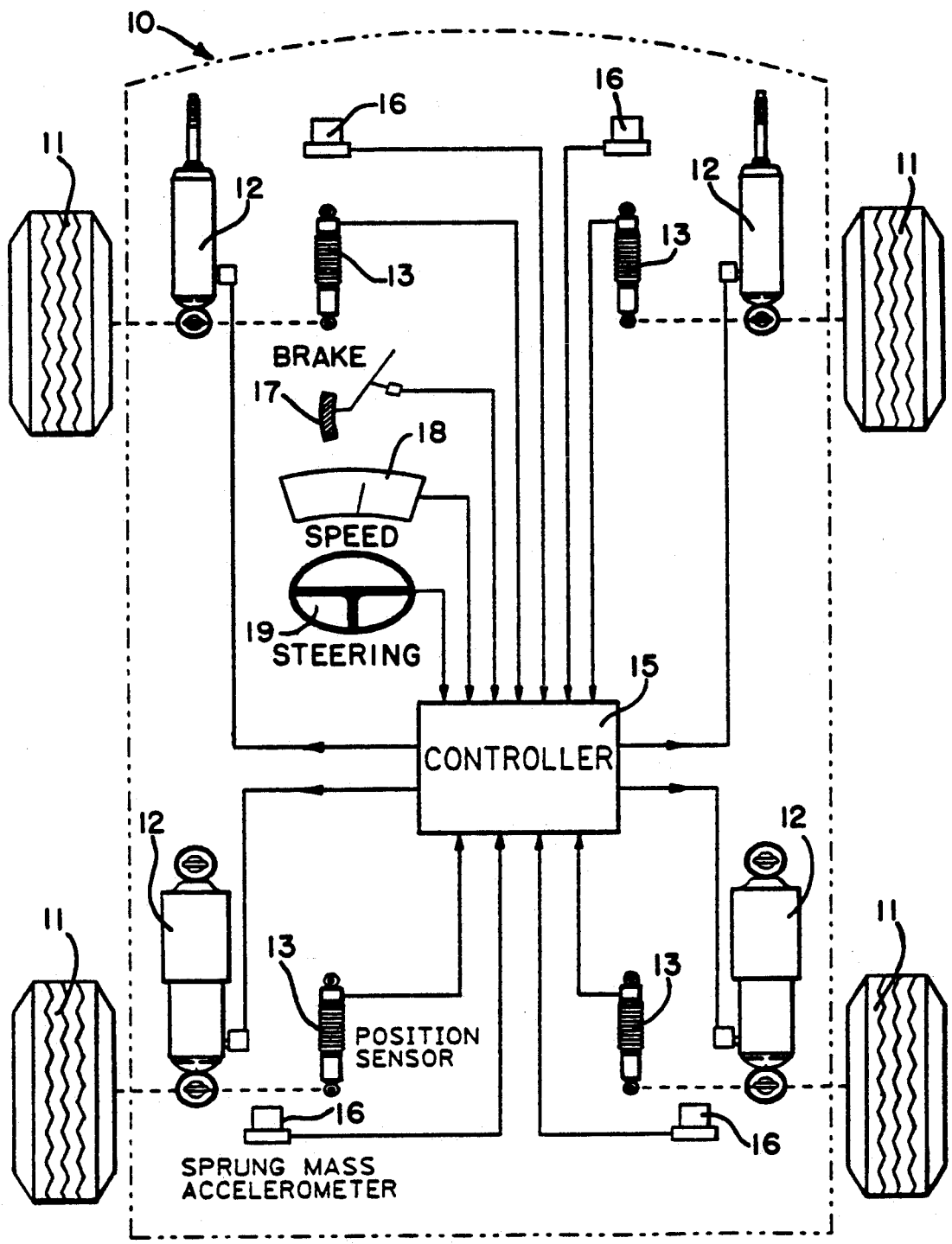
FIG. 1 shows a schematic diagram of a motor vehicle with a suspension control according to the invention.
Figure 2:
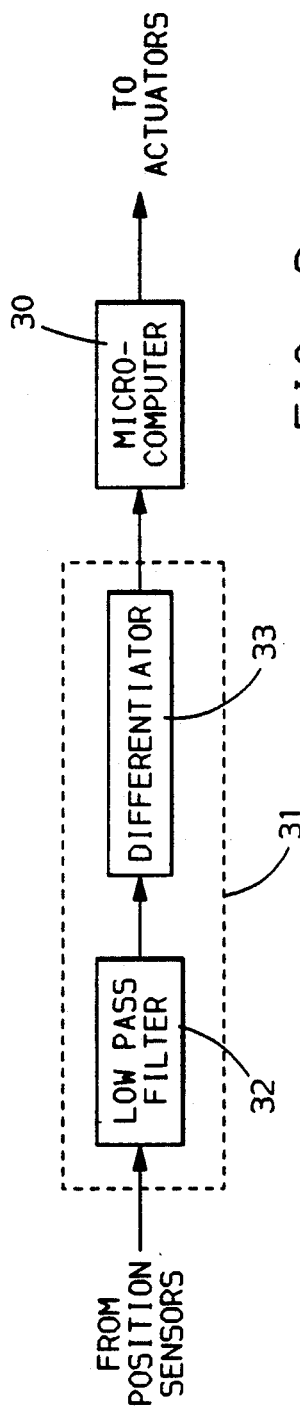
FIG. 2 is a partial block diagram of the controller of FIG. 1.

Referring to FIG. 1, a motor vehicle has a body 10 comprising a sprung mass. Body 10 is essentially rectangular in shape and is supported on a wheel 11 at suspension points comprising each of its corners by suspension apparatus 12 comprising a weight bearing suspension spring in parallel with a suspension actuator connected to exert a controllable force in parallel with the spring between the body 10 and wheel 11 at that suspension point. The suspension actuator may be a hydraulic or electric actuator capable of providing power to the suspension, as used in a fully active suspension control. Alternatively, the actuator may be a variable damper, which is capable only of dissipating power, as used in a semi-active suspension control. If a variable damper, it may provide damping control in either a continuous or a discrete manner. Suspension apparatus 12 further includes an axle for rotatably supporting wheel 11 and such other suspension components, such as control arms, as are required for and comprise the unsprung mass of a standard vehicle suspension.

At each corner of body 10, a suspension position sensor 13 is connected between the body and unsprung mass to measure the relative vertical position thereof and generate an output suspension position signal for input to a controller 15. The relative suspension position signal is differentiated to produce a relative suspension velocity signal. An acceleration sensor 16 may be positioned at each corner of body 10 to generate an absolute vertical acceleration signal of that corner of body 10 for input to controller 15. The absolute body corner velocities at the four corners of the body may be derived from these acceleration signals. From the difference between the body corner velocity and relative suspension velocity at each corner, controller 15 is able to compute the vertical wheel velocity at that corner; and from the vertical wheel velocity and various body corner velocities, controller 15 is able to compute the desired force between the body and wheel at that corner of the vehicle. Additional signals which may optionally be generated are a vehicle deceleration or braking signal by brake sensor 17, a vehicle speed signal from vehicle speed sensor 18 and a vehicle steering signal from vehicle steering sensor 19.

The hardware configuration of suspension apparatus 12 and controller 15 is described in more detail in U.S. Pat. No. 5,071,157 to Kamal N. Majeed, issued Dec. 10, 1991. For the purpose of this description, it is sufficient to state that controller 15 comprises at least a digital microcomputer 30 having a CPU, RAM, and ROM; and the relative suspension position signals from position sensors 13 are provided to microcomputer 30 through input/output (I/O) apparatus 31. I/O apparatus 31 comprises a low pass filter 32 for receiving and filtering the relative suspension position signals from position sensors 13 and a differentiator circuit 33 for differentiating the filtered signals and providing relative suspension velocity signals to microcomputer 30. Either I/O apparatus 31 or microcomputer 30 includes A/D conversion apparatus to convert the relative suspension velocity signals to digital form at a predetermined sampling frequency of 1 KHz.

Figure 4:
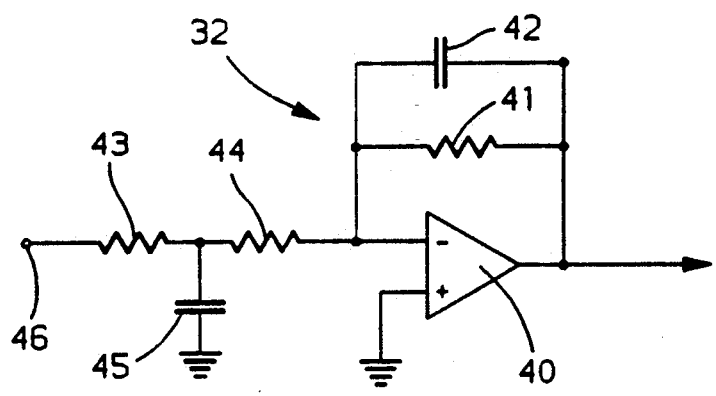
FIG. 4 is a circuit diagram of a low pass filter for use in the suspension control of FIGS. 1 and 2.

A representative circuit for use as low pass filter 32 is shown in FIG. 4. The precise circuit configuration of low pass filter 32 is not critical to this invention, as long as it provides two pole low pass filtering with a half power frequency sufficiently above 10 Hz to minimally affect signals having frequencies of 10 Hz or lower. Referring to FIG. 4, an operational amplifier 40 has a grounded non-inverting input and an inverting input connected to an output through a negative feedback resistor 41 (94K) and capacitor 42 (0.01uF) in parallel. The 94K resistance may be achieved by two standard 47K resistors in series. An input terminal 46 is adapted to receive the relative suspension position signal from a sensor 13 and is connected through two resistors 43, 44 (47K each) in series to the inverting input of operational amplifier 40. The junction of resistors 43 and 44 is connected through a capacitor 45 (0.022uF) to ground. The circuit is a standard two pole active low pass filter, with a half power frequency of approximately 100 Hz and a stop band slope of 12 dB/octave; and it provides, at its output, a filtered relative suspension position signal.

Figure 3:
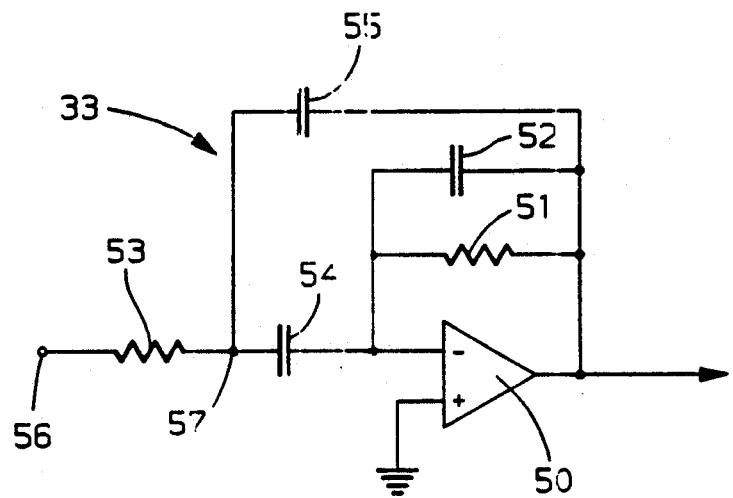
FIG. 3 is a circuit diagram of a differentiator for use in the suspension control of FIGS. 1 and 2.

The differentiator circuit is shown in FIG. 3. An operational amplifier 50 has a grounded non-inverting input and an inverting input connected to an output through a negative feedback resistor 51 (820K) and capacitor 52 (0.001uF) in parallel. An input terminal 56, which receives the filtered relative suspension position signal from the output of low pass filter 32, is connected through a resistor 53 (8K) in series with a capacitor 54 (0.1uF) to the inverting input of operational amplifier 50. Finally, a capacitor 55 (0.01uF) is connected from the output of operational amplifier 50 to junction 57 of resistor 53 and capacitor 54.

Figure 5:
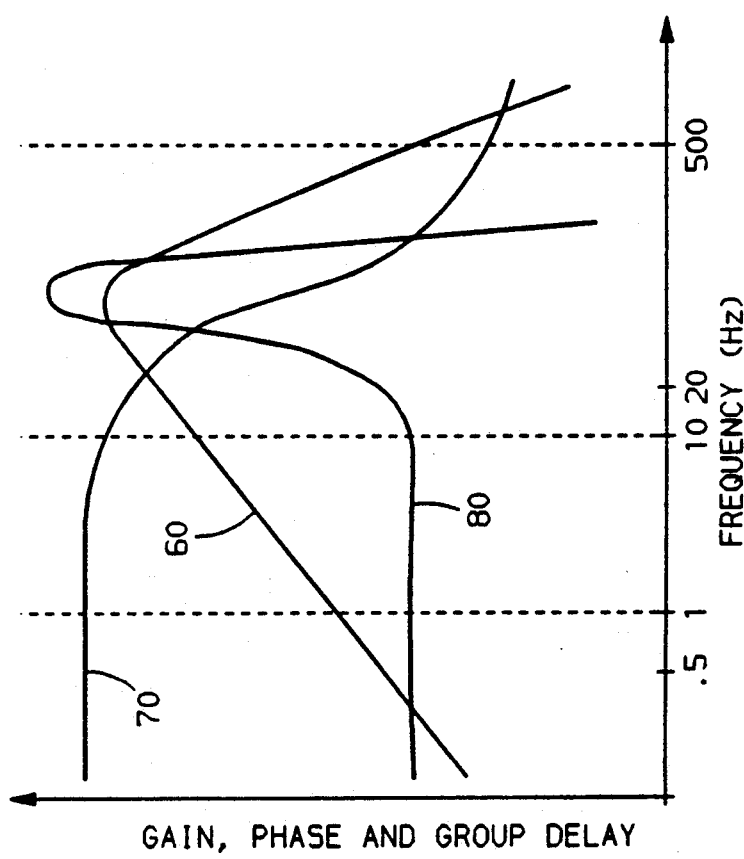
FIG. 5 shows curves of gain, phase and group delay for the differentiator and low pass filter of FIGS. 1-4.

In the circuit of differentiator 33, capacitor 54 and feedback resistor 41 provide a differentiating characteristic of a linearly increasing gain through a low frequency range of 0.5 to 20 Hz and a 90 degree phase lead substantially through the same frequency range. This range includes, at its low end, the 1 Hz typical resonance of vertical vibration of a passenger vehicle sprung mass. It further includes, at its high end, the 8-10 Hz typical resonance of vertical vibration of a passenger vehicle unsprung mass. It further brackets the 5-6 Hz typical frequency of vertical vibrations to which the human body is most susceptible in a passenger vehicle. Thus, these components provide a differentiating action in the frequency range of greatest interest to a passenger vehicle suspension control system. This can be seen in reference to the curves of FIG. 5, in which curves 60, 70 and 80 depict gain, phase and group delay, respectively, as functions of frequency, for a system including low pass filter 32 and differentiator 33. It can be seen that, in the frequency range 1-10 Hz, the gain is linearly increasing, the phase is constant (90 degrees leading), and the group delay is constant (3 msec). This low group delay is achieved even with the contribution to group delay from low pass filter 32. The curves emphasize the differentiating action with low group delay in the frequency range in which suspension related signals will appear, due to vehicle resonances.

In an intermediate frequency range above the low frequency range of suspension resonances but below 500 Hz, the gain 60 continues to increase to a peak at a frequency of approximately 60 Hz and thereafter falls at the rate of 18 db/octave, of which 12 dB is due to low pass filter 32 as previously described and another 6 dB is due to differentiator circuit 33. The phase 70 starts changing significantly in the lagging direction as it passes 10 Hz and reaches its greatest rate of change at approximately 60–100 Hz, after which the change gradually slows but continues within the range. The group delay 80 increases rapidly in the range 20–60 Hz to a peak of approximately 10 msec, after which it falls rapidly to an insignificant level within the range. Clearly, both gain and group delay reach maximum values within this range which would be unacceptable in the lower frequency range of suspension resonances. However, since suspension inputs in this intermediate frequency range are much smaller and excite no significant resonances in the vehicle, the larger gain and group delay have no significant effect on the output signal of the differentiator.

At the aliasing frequency of 500 Hz, the gain of the circuits has fallen significantly: in this embodiment, to unity or below. It continues to fall with frequency in the high frequency range above 500 Hz. The phase, which eventually approaches 270 degrees lagging, and the group delay are essentially irrelevant, since the gain is so low that signals at these frequencies are essentially suppressed. Thus, aliasing distortion is avoided. In this manner, the requirements of a differentiator to derive a relative suspension velocity signal in a suspension control system are met.

The resulting circuit is essentially a comparatively high Q bandpass filter having differentiating characteristics on the low frequency side of an intermediate frequency of peak gain which are controlled by the RC time constant (0.082 in this embodiment) of resistor 51 and capacitor 54. The differentiating gain is predetermined for the vehicle sprung and unsprung masses, which limit the maximum relative suspension velocity, the range of the displacement sensor and the voltage range of the differentiator circuit power supply. The peak frequency and roll-off characteristics on the high side thereof are controlled by the RC time constant of resistor 53 and capacitor 55, as well as the coordinated values of the components of low pass filter 32. However, this circuit, without capacitor 52, can be a very high Q circuit with high noise amplification at the intermediate frequency and a tendency to ring. Therefore, capacitor 52 provides an adjustment of the Q of the circuit to control its resonance. In the embodiment as shown, an increase in the capacitance of capacitor 52 will provide a lower and flatter peaked gain 60 for lower high frequency noise. In addition, phase change 70 will begin at a lower frequency and proceed somewhat slower with increased frequency. Therefore, group delay 80 will be lowered at its peak but will be greater in the low frequency range of suspension resonances. A decrease in the capacitance of capacitor 52, on the other hand, produces a higher Q for a higher gain peak and greater high frequency noise. It also provides a sharper and later change in phase for a higher group delay at the intermediate frequency but a lower group delay in the lower frequency range of suspension resonances. Unfortunately, it also provides a greater tendency for instability and ringing. Capacitor 52 allows the circuit designer to achieve the optimum balance between the amplitude of peak gain, which affects stability and high frequency noise, and group delay in the low frequency range.

The embodiments of the invention in which an exclusive property or privilege is claimed are defined as follows:

1. A suspension for a vehicle having a sprung mass and an unsprung mass and comprising, in combination:
   an actuator connected between the sprung mass and the unsprung mass;
   a relative suspension position sensor connected between the sprung mass and the unsprung mass for generating an analog relative position signal;
   a digital suspension control for receiving and A/D converting an analog relative suspension velocity signal at a predetermined sampling rate and generating a control signal for the actuator to provide a desired suspension behavior; and
   an analog circuit apparatus for deriving the analog relative suspension velocity signal from the analog relative position signal, the analog circuit apparatus comprising a bandpass filter having a linearly increasing gain and a 90 degree phase lead for differentiating action in a low frequency range of vehicle suspension resonances in which signal differentiation is desired, the bandpass filter further having a high Q with a peaking gain and a peaking group delay in an intermediate frequency range above the low frequency range of vehicle suspension resonances, in which intermediate frequency range vehicle suspension inputs are small, and a decreasing gain from the intermediate frequency range to a higher aliasing frequency related to the sampling frequency of the digital signal processing apparatus.

2. The vehicle suspension of claim 1 in which the analog apparatus further comprises a two pole low pass filter preceding the bandpass filter to further decrease the low gain at the higher aliasing frequency.

3. The vehicle suspension of claim 1 in which the low frequency range of vehicle suspension resonances includes the frequencies of 1 Hz and 10 Hz.

4. The vehicle suspension of claim 3 in which the low frequency range comprises the frequencies of 0.5 Hz to 20 Hz.

5. The vehicle suspension of claim 1 in which the aliasing frequency is substantially 500 Hz.

6. A suspension for a vehicle having a sprung mass and an unsprung mass and comprising, in combination:
   an actuator connected between the sprung mass and the unsprung mass;
   a relative suspension position sensor connected between the sprung mass and the unsprung mass for generating an analog relative position signal;
   a digital suspension control for receiving and A/D converting an analog relative suspension velocity signal at a predetermined sampling rate and generating a control signal for the actuator to provide a desired suspension behavior; and
   an analog circuit apparatus for deriving the analog relative suspension velocity signal from the analog relative position signal, the analog circuit apparatus comprising, in combination:
   an operational amplifier;

a first resistor connected in negative feedback from an output of the operational amplifier to an inverting input thereof;

a circuit input connected through a first capacitor to the inverting input of the operational amplifier, the first resistor and first capacitor together providing a linearly increasing gain and a 90 degree phase lead for differentiating action over a low frequency range of vehicle suspension resonances;

a second resistor connecting the circuit input to the first capacitor;

a second capacitor connected from the output of the operational amplifier to the junction of the second resistor and first capacitor, the second resistor and second capacitor together with the first resistor and first capacitor defining a bandpass filter having a high Q with a peaking gain in an intermediate frequency range above the low frequency range of vehicle suspension resonances, the second resistor and second capacitor together providing a decreasing gain from the intermediate frequency range to define a predetermined low gain at a higher aliasing frequency related to the sampling frequency of the digital signal processing apparatus; and a third capacitor connected in parallel with the first resistor to control the Q of the bandpass filter so as to balance the amplitude of the peaking gain in the intermediate frequency range with the group delay in the lower frequency range of vehicle suspension resonances.

7. The vehicle suspension of claim 6 in which the analog circuit apparatus further comprises a two pole low pass filter preceding the bandpass filter to further decrease the low gain at the higher aliasing frequency.

8. The vehicle suspension of claim 6 in which the low frequency range of vehicle suspension resonances includes the frequencies of 1 Hz and 10 Hz.

9. The vehicle suspension of claim 8 in which the low frequency range of vehicle suspension resonances comprises the range of substantially 0.5 Hz to 20 Hz.

10. The vehicle suspension of claim 6 in which the aliasing frequency is substantially 500 Hz.

* * * * *